United States Patent
Johnson et al.

(10) Patent No.: US 10,388,230 B2
(45) Date of Patent: Aug. 20, 2019

(54) TEMPORALLY MULTIPLEXING BACKLIGHT WITH ASYMMETRIC TURNING FILM

(71) Applicant: 3M INNOVATIVE PROPERTIES COMPANY, St. Paul, MN (US)

(72) Inventors: Nicholas A. Johnson, Burnsville, MN (US); Kenneth A. Epstein, Saint Paul, MN (US); James M. Hillis, Redmond, WA (US); Michael E. Lauters, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 15/314,913

(22) PCT Filed: May 18, 2015

(86) PCT No.: PCT/US2015/031317
§ 371 (c)(1),
(2) Date: Nov. 29, 2016

(87) PCT Pub. No.: WO2015/183604
PCT Pub. Date: Dec. 3, 2015

(65) Prior Publication Data
US 2017/0116930 A1    Apr. 27, 2017

Related U.S. Application Data

(60) Provisional application No. 62/005,420, filed on May 30, 2014.

(51) Int. Cl.
*G09G 3/36* (2006.01)
*G06F 3/038* (2013.01)
(Continued)

(52) U.S. Cl.
CPC ......... *G09G 3/3406* (2013.01); *G02B 6/0046* (2013.01); *G02B 6/0053* (2013.01);
(Continued)

(58) Field of Classification Search
CPC ........................... G02B 6/0053; G02B 6/0038
See application file for complete search history.

(56) References Cited

U.S. PATENT DOCUMENTS

| 6,560,026 B2 | 5/2003 | Gardiner |
| 6,889,164 B2 | 5/2005 | Okuda |

(Continued)

FOREIGN PATENT DOCUMENTS

| CN | 102011981 | 4/2011 |
| JP | 2001-066547 | 3/2001 |

(Continued)

OTHER PUBLICATIONS

International Search Report for PCT International Application No. PCT/US2015/031317 dated Aug. 26, 2015, 3 pages.

*Primary Examiner* — Nan-Ying Yang
(74) *Attorney, Agent, or Firm* — Michael Stern (57) ABSTRACT

Backlights are disclosed. More particularly, temporally multiplexed backlights utilizing asymmetric turning films are disclosed. The disclosed backlights are capable of displaying a primary image to on-axis viewers while simultaneously providing a secondary image to off-axis viewers.

41 Claims, 3 Drawing Sheets

(51) Int. Cl.
*G09G 5/00* (2006.01)
*G09G 3/34* (2006.01)
*G02F 1/13* (2006.01)
*G02F 1/1335* (2006.01)
*F21V 8/00* (2006.01)
*H04N 13/30* (2018.01)

(52) U.S. Cl.
CPC ......... *G02B 6/0068* (2013.01); *G02F 1/1323* (2013.01); *G02F 1/133615* (2013.01); *G02F 2001/133607* (2013.01); *G09G 2320/028* (2013.01); *H04N 2013/403* (2018.05)

(56) References Cited

U.S. PATENT DOCUMENTS

| | | | |
|---|---|---|---|
| 7,085,060 B2 | 8/2006 | Matsushita | |
| 7,201,510 B2 | 4/2007 | Yamashita | |
| 7,677,733 B2 | 3/2010 | Brott | |
| 8,059,229 B2 | 11/2011 | Shinkai | |
| 9,261,640 B2 | 2/2016 | Koike | |
| 2002/0057497 A1 | 5/2002 | Gardiner | |
| 2004/0090684 A1* | 5/2004 | Wolfe | G02B 3/08 359/742 |
| 2005/0041174 A1* | 2/2005 | Numata | G02B 6/0053 349/61 |
| 2006/0139956 A1 | 6/2006 | Soh | |
| 2007/0053206 A1 | 3/2007 | Yamashita | |
| 2008/0088935 A1* | 4/2008 | Daly | H04N 13/0454 359/613 |
| 2008/0198295 A1 | 8/2008 | Yuuki | |
| 2011/0221999 A1 | 9/2011 | Shiau | |
| 2012/0154450 A1 | 6/2012 | Aho | |
| 2012/0236403 A1 | 9/2012 | Sykora | |
| 2012/0327507 A1 | 12/2012 | Padiyath | |
| 2013/0038928 A1 | 2/2013 | Padiyath | |
| 2013/0250427 A1 | 9/2013 | Lee | |
| 2013/0265625 A1 | 10/2013 | Facke | |
| 2013/0343081 A1* | 12/2013 | Niu | G02F 1/13336 362/606 |
| 2014/0085570 A1 | 3/2014 | Kuwata | |

FOREIGN PATENT DOCUMENTS

| | | |
|---|---|---|
| JP | 2001066547 A * | 3/2001 |
| JP | 2004-077632 | 3/2004 |
| JP | 2005-235661 | 9/2005 |
| JP | 2008-305728 | 12/2008 |
| JP | 2009-093989 | 4/2009 |
| JP | 2012-042879 | 3/2012 |
| JP | 2012-109104 | 6/2012 |
| JP | 2012-0249407 | 12/2012 |
| TW | M331676 | 5/2008 |
| WO | WO 2001-22131 | 3/2001 |
| WO | WO 2008-117917 | 10/2008 |
| WO | WO 2013-012865 | 1/2013 |
| WO | WO 2015-153329 | 10/2015 |

* cited by examiner

TEMPORALLY MULTIPLEXING BACKLIGHT WITH ASYMMETRIC TURNING FILM

CROSS REFERENCE TO RELATED APPLICATIONS

This application is a national stage filing under 35 U.S.C. 371 of PCT/US2015/031317, filed May 18, 2015, which claims the benefit of Provisional Application No. 62/005,420, filed May 30, 2014, the disclosure of which is incorporated by reference in its/their entirety herein.

BACKGROUND

Turning films are used in many display and lighting applications to change the angular distribution of light. Turning films generally have features which operate by refracting and/or reflecting light. Turning films may be used in conjunction with light sources to provide a desired light output.

Temporal multiplexing in display applications generally refers to providing non-continuous series of images through the same backlight architecture at a rate faster than the perceptible limit for a human observer. The brain perceives the separate images as combined.

SUMMARY

In one aspect, the present disclosure relates to a display device. The display device includes a first light source and a second light source having differently oriented light distributions, an asymmetric turning film including a first major surface and a second major surface where the second major surface includes a plurality of microstructures each including one of a first face having a first shape and one of either a second face or a third face having a different third shape, a liquid crystal panel including a plurality of pixels, and a controller configured to independently drive the first light source, the second light source, and the liquid crystal panel, where light from the first light source is preferentially reflected by a first face but not a second face or a third face, where light from the second light source is preferentially reflected by a second face or a third face but not by a first face, where the controller is configured to rapidly switch the liquid crystal panel between a primary state and a secondary state, and wherein the controller is configured to also rapidly switch the driving of the first light source and the second light source such that the liquid crystal panel is in a primary state when the first light source but not the second light source is illuminated and the liquid crystal panel is in a secondary state when the second light source but not the first light source is illuminated.

In some embodiments, the controller is configured such that the secondary state is a static state. The static state may be a noise pattern, may be fully transmissive, may include an image, may include a logo, may include a plausible workspace, or advertising material. In some embodiments, the controller may be configured such that the secondary state is a dynamic state. The dynamic state may include a transformation of the primary state, may include animation, may include moving objects, flashing images, or advertising material. In some embodiments, the display device further includes a lightguide configured to transport light from at least one of the first light source and the second light source. In some embodiments, the lightguide is wedge-shaped. In some embodiments, the display device also includes a second lightguide configured to transport light from at least one of the first light source and the second light source. In some embodiments, the first major surface of the asymmetric turning film is a smooth surface. In some embodiments, the plurality of microstructures are linear microstructures. In some embodiments, the asymmetric turning film includes at least one of an antireflective coating or an antireflective structured surface. In some embodiments, at least one of the first face, the second face, or the third face includes a sawtooth or sinusoidal surface structure. In some embodiments, at least one of the first light source and the second light source includes a plurality of LEDs. In some embodiments, the controller, the first light source, the second light source, and the liquid crystal panel are configured to switch from a primary state to a secondary state about every 8 ms.

DETAILED DESCRIPTION

Asymmetric turning films may be used in conjunction with multiple light sources to provide useful or desirable output distributions of light. For example, the asymmetric turning films may have faces that are configured to reflect light from one light source but not another. In some embodiments, these asymmetric turning films may have a plurality of microstructures or prisms, each having at least two faces. If these faces are shapes or orientated differently with respect to their corresponding light sources (i.e., a light source that is preferentially reflected by that face), then the resulting output may be different as well. While a well-designed and meticulously-manufactured asymmetric turning film may itself result in a difference in distribution sufficient to for example, limit the ability to view a display from oblique angles (i.e., to provide privacy), it may not be practical or economical to require such demanding manufacturing tolerances. In other cases, it may be difficult or impossible to provide a desirable on-axis viewing angle distribution while simultaneously providing a sharp cutoff angle and completely extinguished off-axis visibility. Therefore, in one aspect, the backlight described in the present application provides a secondary image at oblique angles. As such, even if a primary image is still viewable at oblique angles, the secondary image may dominate or obscure the dim primary image to prevent an onlooker from easily reading or understanding information contained in the primary image. In other applications, two separate images can be enabled to, for example, provide at least two different visual experiences for viewers standing at different relative positions to a display.

Figure 1:
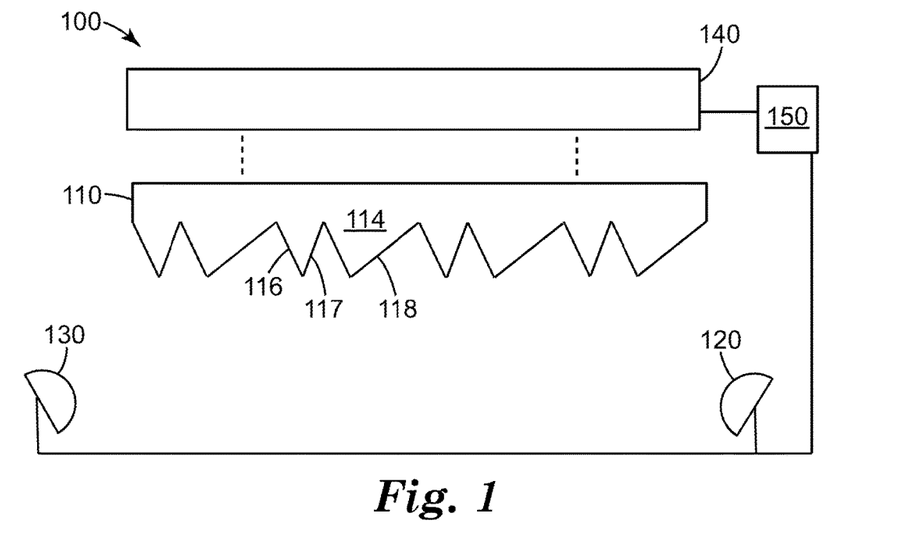
FIG. 1 is a schematic elevation cross-section of a temporally multiplexing backlight with an asymmetric turning film.

FIG. 1 is a schematic elevation cross-section of a temporally multiplexing backlight with an asymmetric turning film. Backlight 100 includes asymmetric turning film 110 including microstructures 114 including one or more of first face 116, second face 117, and third face 118, first light source 120 and second light source 130, liquid crystal panel 140, and controller 150.

Asymmetric turning film 110 may be any suitable thickness and may be made from any suitable material. In some embodiments, asymmetric turning film 110 will be formed from a polymeric material, such as polycarbonate, polyethylene terephthalate, polyethylene naphthalate, poly(methyl methacrylate) and copolymers and blends of the same. In some embodiments, asymmetric turning film 110 may be optically transparent or have low haze and high clarity to avoid undesirably scattering incident light. In some embodiments, the asymmetric turning film may have a sufficiently high index of refraction, such as 1.5 or greater, to ensure that total internal reflection occurs at a sufficiently broad range of angles. Other appropriate materials include acrylics, polystyrenes, methyl styrenes, acrylates, polypropylenes, polyvinyl chlorides, and the like. In some embodiments the material, dimensions, or both of asymmetric turning film 110 may be selected in order to produce a flexible film.

A first surface of asymmetric turning film 110 may be substantially smooth. However, the surface need not be completely smooth in all embodiments, and may qualify as a substantially smooth surface as long as the surface does not contain microstructures. For example, an anti-wetout or anti-glare beaded coating may be included or incorporated on the surface, and such a surface may still be considered substantially smooth for the purposes of this application. In other words, smooth is not used in the sense of not rough; instead, it is used in the sense of not structured.

A second, structured major surface of asymmetric turning film 110 includes microstructures 114. Each of microstructures 114 may be linear microstructures; that is, microstructures 114 may extend along a direction with substantially the same or identically the same cross-sectional shape (in the exemplary configuration of FIG. 1, along the axis into/out of the page). Microstructures 114, and more generally, the structured surface of asymmetric turning film 110 may be formed through any suitable process, such as a microreplication process. For example, the structured surface may be formed through cutting (fly cutting, thread cutting, diamond turning or the like) a suitable tool with the negative of the desired structure and pressing a compliant but curable or hardenable material against the tool surface. The material may be subsequently hardened or cured (for example, through exposure to light such as ultraviolet light), leaving the structured surface with the desired features. Other processes may be possible, including casting and curing with an electroplated, laser cut, or etched tool, using photolithography such as two-photon mastering of a tool in conjunction with a cast and cure process, or even direct machining or an additive three-dimensional printing process.

Microstructures 114 may all be the same or they may different. Patterns and arrangements of microstructures 114 are discussed in more detail elsewhere in the application, particularly in conjunction with FIGS. 2 and 3. Each of microstructures 114 has a first face 116 and one of second face 117 or third face 118. First face 116 optically corresponds to first light source 120 and second face 117 and third face 118 correspond to second light source 130. In that sense, and discussed in more detail in conjunction with FIG. 3, first face 116 preferentially reflects light from first light source 120 but not second light source 130, and second face 117 and third face 118 preferentially reflects light from second light source 130. The overall arrangement of the microstructures on structured surfaces of asymmetric turning film 110 may have any suitable pitch and may or may not have land (flat areas) between microstructures 114. Microstructures 114 may be any appropriate size, and in many cases may be on the millimeter or micrometer scale, in some cases between 10 and 100 micrometers or between 10 and 300 micrometers. The pitch or size of microfeatures 114 may increase, decrease, both increase and decrease, or remain constant for all or portions of structured surfaces of asymmetric turning film 110.

First light source 120 and second light source 130 may be any suitable light source or combination of light sources. In many cases, light sources for first light source 120 and second light source 130 are light emitting diodes (LEDs). First light source 120 and second light source 130 are referred to in the singular, but each may represent a bank or series of light sources. For example, first light source 120 may be a series of LEDs extended along the axis into/out of the page. In some embodiments, light sources emit substantially white light. In some embodiments, certain of the components of first light source 120 and second light source 130 emit light of different wavelengths that may together create white light. "White" light may refer to any suitable desirable color point that may be perceived as a viewer as white light and may be adjusted or calibrated depending on the application. In some embodiments, first light source 120 and/or second light source 120 may emit light in one or more of the ultraviolet range, the visible range, or the near-infrared range of the electromagnetic spectrum. First light source 120 and second light source 130 may also be cold cathode fluorescent lights (CCFLs) or even, in some embodiments, incandescent light sources. The light sources and any corresponding injection, collimation, or other optics may be selected to provide any suitable wavelength or combination of wavelengths, polarizations, point spread distributions, and degrees of collimation.

Because first face 116 reflects light preferentially from first light source 120 but not second light source 130, and second face 117 and third face 118 reflect light preferentially from second light source 130 but not first light source 120, asymmetric turning film 110 essentially functions as a first film having first faces when first light source 120 is illuminated, like a second film having second and third faces when second light source 130 is illuminated, or even as both first and second films when both the first and second light sources are illuminated.

First face 116, second face 117, and third face 118, each have shapes: a first, second, and third shape, respectively. Each of these shapes may be substantially linear (as depicted in FIG. 1), or one or more may be curved. First face 116, second face 117, and third face 118 may each have different slopes; in other words, with reference to either a plane characteristic of the length and width dimensions of asymmetric turning film 110 or to a normal to an imagined smooth surface of asymmetric turning film 110, the angles of these faces may be different. In FIG. 1, a microstructure includes either one of first face 116 and second face 117, or one of first face 116 and one of third face 118.

Liquid crystal panel 140 may be any suitable liquid crystal panel, including those commonly and easily obtained commercially. Liquid crystal panel 140 may include any number of pixels or subpixels, including filters for displaying colors. Liquid crystal panel 140 is in optical communication with asymmetric turning film 110 (as indicated by the dashed lines); however, it is not necessarily that the two be optically coupled. In other words, intervening films or air gaps may exist between liquid crystal panel 140 and asymmetric turning film 110. Liquid crystal panel 140 may be adjacent to one or more reflective polarizers, absorbing polarizers, or light redirecting films. Liquid crystal panel 140 may also include appropriate electronic driving components. In some embodiments, liquid crystal panel 140 may have sufficient pixels to support a high definition (HD) or ultra high definition (UHD/4K/8K) display. Liquid crystal panel 140 may be a high transmission panel. In some embodiments, liquid crystal panel 140 may be capable of being very quickly switchable. For example, the liquid crystal panel may be capable of frame durations of less than 10 ms, less than 8 ms, less than 4 ms, or even less than 1 ms.

Controller 150 is in electrical communication (whether wireless or not) with liquid crystal panel 140, first light source 120, and second light source 130. Controller 150 may include or be a microcontroller or microprocessor. Controller 150 may include logic and appropriate input components. In general, controller 150 is configured to coordinate the switching between a primary and secondary image for liquid crystal panel 140 with the selective illumination of first light source 120 (with the primary image) and second light source 130 (with the secondary image). In some embodiments, controller 150 may be configured to do this very quickly, switching between the primary and secondary images every 10 ms, 8 ms, 5, ms, 4 ms, 1 ms, or even quicker. To this effect, controller 150 includes appropriate electronic driving and timing elements. Controller 150 may also be capable of generating or transforming images or signals; for example, the secondary image may be a function of the primary image generated by the controller. In some embodiments, controller 150 may be capable of generating a pseudorandom noise function. Controller 150 may receive input from other electronic components, such as a video card, that may provide the content of the primary and secondary images.

Figure 2:
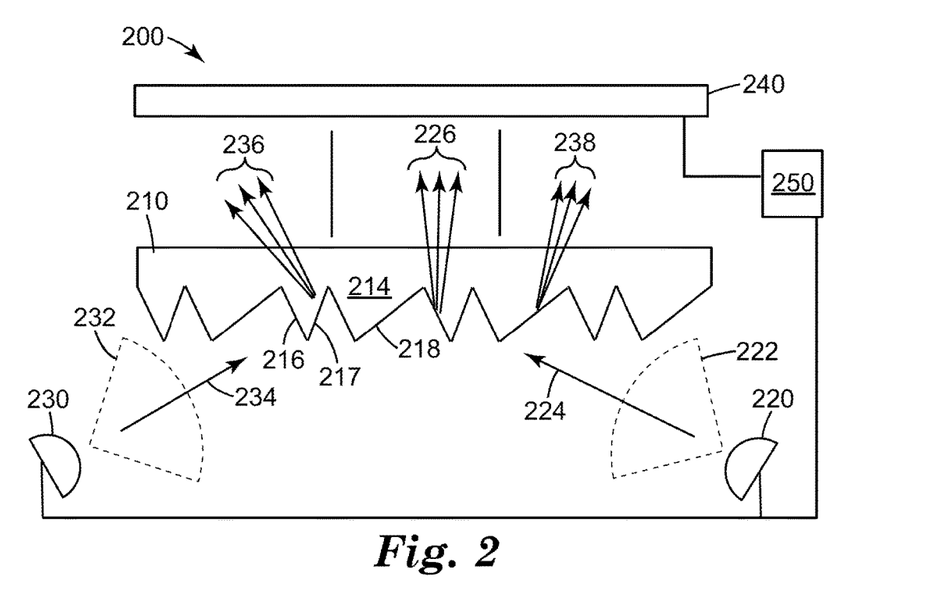
FIG. 2 is a schematic elevation cross-section of the backlight of FIG. 1 illustrating its general optical principles.

FIG. 2 is a schematic elevation cross-section of the backlight of FIG. 1. Backlight 200 includes asymmetric turning film 210 including microstructures 214 including one or more of first face 216, second face 217, and third face 218, first light source 220 generating first light distribution 222 including first exemplary ray 224, second light source 230 generating second light distribution 232 including second exemplary ray 234, liquid crystal panel 240, and controller 250.

FIG. 2 corresponds substantially to the backlight of FIG. 1, but highlights the general optical principle by tracing exemplary rays and input distributions with backlight 200. In a first state, controller 250 sets liquid crystal panel 240 to display a primary image. Simultaneously or near simultaneously, controller 250 provides an appropriate drive signal to first light source 220 and second light source 230 such that the first light source is on and the second light source is off.

Light from first light source 220 is emitted within first light distribution cone 222. The degree of collimation may depend on both light source 220 and any accompanying collimation or injection optics (for example, a lightguide). In some embodiments, particularly when first light source 220 includes a bank of parallel light sources, the light distribution cones effectively merge to create an extended wedge (for example, as if the cross-section of the first light distribution cone were projected into or out of the page). The light distribution cone may also be an extended wedge in embodiments where the light sources are linear light sources, such as a CCFL tube. In any event, for explanatory purposes, light from first light source 220 is represented by first exemplary ray 224, which is incident on asymmetric turning firm 210. Because asymmetric turning film 210 will have an index of refraction higher than air, light traveling from air into the turning film (as depicted in FIG. 2) will be refracted but not substantially reflected by second face 217 and third face 218, except from Fresnel reflections at the interface. These Fresnel reflections may be reduced by providing an anti-reflection coating or treatment on the surface of the asymmetric turning film. In some embodiments, anti-reflection may be provided by an antireflective structured surface, such as a moth's eye structure or the like. Exemplary ray 224 is then substantially reflected by one of first face 216, provided that the incidence angle is subcritical for the turning film/air interface as to be totally internally reflected. The reflection off first face 216 for all of light emitted from first light source 220 incident on asymmetric turning film 210 produces a first output distribution 226. This first output distribution is incident on liquid crystal panel 240 configured to display the primary image. An observer viewing optical system 200 would perceive the primary image at angles only within first output distribution 226.

In a second state, controller 250 sets liquid crystal panel 240 to display a secondary image. Simultaneously or near simultaneously, controller 250 provides an appropriate drive signal to first light source 220 and second light source 230 such that the first light source is off and the second light source is on.

For light from second light source 230, light falls within second light distribution cone 232, and is represented by second exemplary ray 234. The first and second light sources have differently oriented light distributions. Exemplary ray 234 is refracted as it passes through first face 216 but is substantially not reflected (except for Fresnel reflections). Second exemplary ray 234 is reflected at the interface created by either second face 217 or third face 218, where the sum of all light emitted from second light source 230 incident on asymmetric turning film 210 produces second output distribution 236 (corresponding to reflections from second face 217) and third output distribution 238 (corresponding to reflections from third face 218). The second set and third set of output distributions may be different from the first set of output distributions, as depicted in FIG. 3. This may be due to the face geometry, the size and overall arrangement of the microstructures and their placement relative to the light sources, or the optical characteristics of the light sources including wavelength, collimation, and emission distribution (i.e., Lambertian). To minimize scattering, antireflective coatings may be placed on the microstructures, the backside of the turning film, or even on other components of the overall system not pictured, including polarizers and the like. Because the light from second light source 230 is responsible for two separate light distribution portions (due to its preferential reflection from two different face geometries), in some embodiments second light source 230 may be driven or configured to produce a higher light output than first light source 220. An observer viewing optical system 200 would perceive the secondary image at angles only within second output distribution 236 or third output distribution 238.

By switching quickly between the first state and second state, a viewer positioned within the range of first output distribution 226 will view the primary image but not perceive the display of the secondary image nor the very brief effectively blank frame during the second state. If at all, the secondary image will appear very dim to a viewer within the range of first output distribution 226. Likewise, a viewer within the range of either second output distribution 236 or third output distribution 238 will view the secondary image but not the primary image nor the very brief effectively blank frame during the first state. For situations where a viewer is within the range of either the second or third output distribution but also near the range of the first output distribution, that viewer may also be able to perceive dimly the primary image as well as the secondary image. For this reason, in some embodiments, the secondary image may be selected or designed to be distracting or to render content difficult to read. Various possibilities for the secondary image's content or presentation are described in conjunction with FIGS. 5A and 5B, below.

In some embodiments, there may be a state where both the first and second light sources are illuminated, and the liquid crystal panel does not switch. In some embodiments, there may be a state where the first and second light sources switch, but the primary and secondary state for the liquid crystal panel are the same. In some embodiments, selected portions of the primary image and the secondary image may be the same; in other words, the liquid crystal panel may be configured to provide privacy (or limit unobscured visibility of the primary image to on-axis viewers) to some portions of the screen but not others. This may be based on a data tag for the content of certain windows or applications that indicates either public or private content. In these cases, the display provides a wider viewing angle (both on- and off-axis viewing) and may be placed or moved to this state (either fully or partially) in order to share content with others not positioned directly on-axis.

Figure 3A:
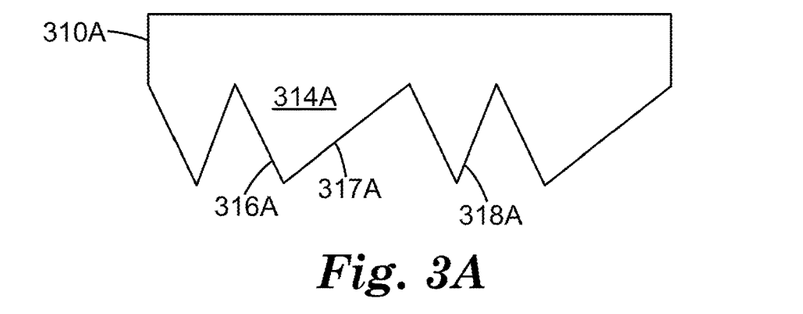
FIGS. 3A and 3B are elevation cross-section portions of exemplary asymmetric turning films.
Figure 3B:
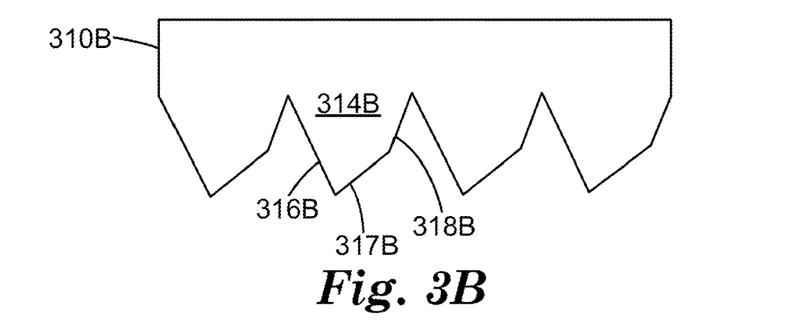

FIG. 3A is an elevation cross-section portion of an exemplary asymmetric turning film. Turning film portion 310A includes microstructures 314A, including one or more of first face 316A, second face 317A, and third face 318A. FIG. 3B is an elevation cross-section portion of another exemplary asymmetric turning film. Turning film portion 310B includes microstructures 314B, including one or more of first face 316B, second face 317B, and third face 318B.

First microstructures 314A are substantially as shown in FIG. 1. A microstructure axis may be defined as a line that runs from the midpoint of the base of the microstructure (the plane substantially parallel to the land of the asymmetric turning film or the closest planar portion of the film that does not include microstructures) to its vertex. The microstructure axis and its relationship to the microstructures of the asymmetric turning film may be a useful descriptive metric, including the angle between the microstructure axis and the base and the microstructure axis and the faces of the microstructures. First face 316A, second face 317A, and third face 318A may each form different angles with the microstructure axis. Of course, any shape or curvature is possible for either the first or second faces, including parabolic, hyperbolic, elliptical, or circular sections, compound curvature, or several adjacent curved sections or curved sections separated by flat sections. In the embodiments of this application, the microstructure axis is not a symmetry axis. In asymmetric turning film portion 310A, first face 316A is either opposite second face 317A or 318A, with an alternating pattern. Other patterns or even a random or pseudorandom distribution of face combinations are possible. In this sense, over a full film, light from a first direction and light from a second direction each act as if they are incident on a face with an averaged face shape related to the frequency of the face shapes and their distribution across the film.

In an alternative embodiment, turning film portion 310B has microstructure 314B utilizing a compound shape; in essence, second face 317B and third face 318B are on the same side of microstructure 314B. To a reasonable degree of generality, the overall effect of asymmetric turning film 310A and asymmetric turning film 310B is the same; however, in certain cases it may be more difficult to replicate (at least with high fidelity) the more complicated microstructure shape of microstructures 314B on asymmetric turning film 310B.

Engineered surfaces are possible on any of the faces of the microstructures. For example, a sawtooth, alternating parabolic, sinusoidal, or microfeatured (including, for example, microlenses) face geometry may be possible and desired to more effectively spread or shape the output distribution of light reflected by that face. Especially with highly collimated light sources, some applications may benefit from a wider band of light reflected off one or more of the faces of the microstructures of the asymmetric turning film.

Figure 4:
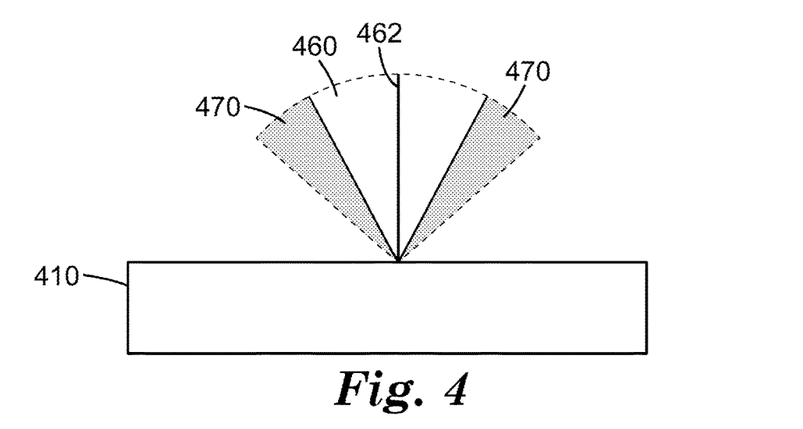
FIG. 4 is a schematic elevation cross-section illustrating light distributions from the backlight of FIG. 1.

FIG. 4 is a schematic elevation cross-section illustrating light distribution from a display including the backlight of FIG. 1. Light from output surface 410 has a first output distribution 460 and a second output distribution 470 that is split, yet they share a midpoint 462. Output surface 410 is simplified and is intended to represent all the optical components within a display. For example, although not illustrated, at least two light sources and a series of microstructures is assumed to be include, as well as, for example, depending on the overall design and configuration, one or more lightguides. In the context of FIG. 4 the top surface of output surface 410 may be considered a display surface. FIG. 4 illustrates two sets of characteristic viewing angles. These characteristic angles (which also may be conical or wedge shaped depending on the configuration of the optical system) represent the viewing angles where an observer can either perceive image data (in the case of a display) or light (in the case of a luminaire or lamp). The first set of characteristic angles 460 and the second set of characteristic angles 470 may vary widely depending on the desired application. In this illustration, the first set of characteristic angles 460 corresponds with light from the first light source that interacts with the first faces of the microstructures of the asymmetric turning film. Likewise, the second set of characteristic angles 470 corresponds with light from the second light source that interacts with the second and third faces of the microstructures of the asymmetric turning film. The definition of these sets of characteristic angles may also vary depending on the application. For example, the edges of a set of characteristic angles may be defined as a point where light intensity drops to half of a maximum (FWHM), or it may be where it crosses a threshold of perceptibility, readability, or even a different arbitrary value for light intensity. In some embodiments, first set of characteristic angles 460 and second set of characteristic angles 470 overlap. First set of characteristic angles 460 has a midline 462 which it shares with second set of characteristic angles 470. Depending on the design of the optical system, the midline may be normal to an emission or display surface of the optical system or it may be at an angle (i.e, set of characteristic angles may not be centered on-axis). In some embodiments, each of the first and second sets of characteristic angles may have different midlines. Any suitable ranges of angles may be used.

Displays including the optical systems described herein may contain additional conventional display components such as polarizers (absorbing and reflective) a liquid crystal (LC) panel including pixels and having subpixels that may correspond to different colors, such as red, green, and blue. For example, the asymmetric turning film may be laminated to or disposed next to one of the polarizers.

Figure 5A:
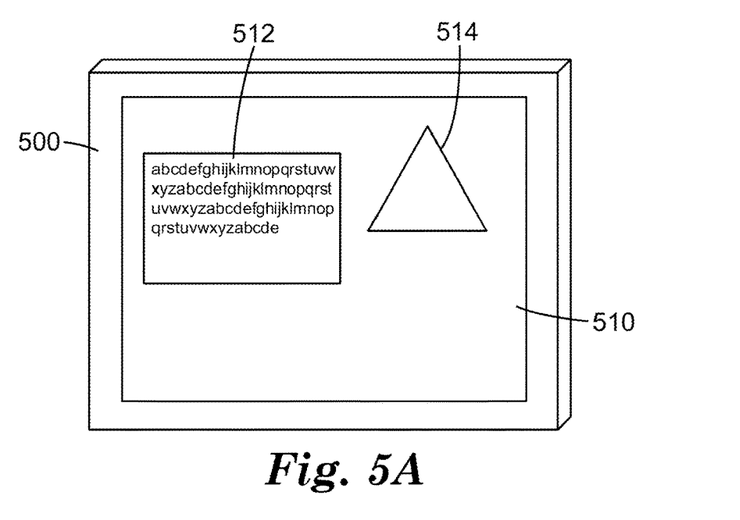
FIGS. 5A and 5B are front and side perspective views of a display utilizing the backlight of FIG. 1.
Figure 5B:
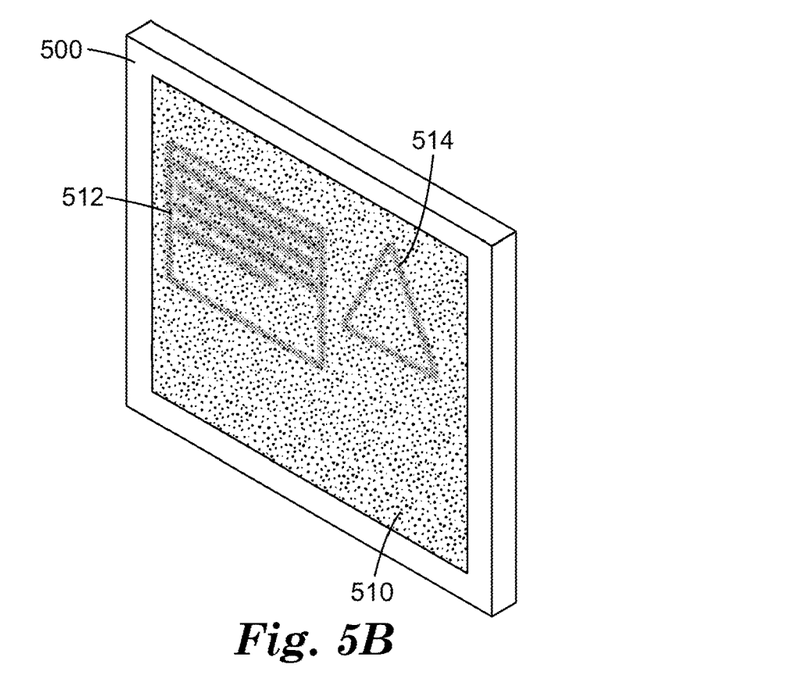

FIGS. 5A and 5B are front and side perspective views of a display including the backlight of FIG. 1. Display 500 includes output surface 510 including text 512 and graphic 514. FIG. 5A represents the appearance of display 500 from a viewing position along an axis substantially normal to the output surface 510 ("on-axis"). In the on-axis state, both text 512 and graphic 514 are easily readable as part of the primary image. In cases where the primary image is being displayed every other frame, the switching speed between the primary and secondary images is sufficiently quick to not be perceptibly choppy or disjointed. The primary image through output surface 510 may be a static image, including text 512 and image 514 for, as an example, part of an advertisement or photograph. In other embodiments, text 512 and image 514 may be part of a dynamic image, either an animation, movie, television content, or a workspace, desktop, or other operating system display, such as on a notebook computer, desktop computer monitor, smartphone, tablet, or similar device. In some embodiments the primary image may at certain times be a static image and may at other times be a dynamic image.

FIG. 5B represents the appearance of display 500 from an off-axis viewing position. In particular, FIG. 5B shows the appearance of display 500 from an off-axis viewing position near the transition between the primary image's viewing angles and the secondary image's viewing angles. Display 500 has output surface 510 where text 512 and image 514 are each substantially obscured or rendered illegible by the dominance of the secondary image, which in this case is a noise or substantially random or pseudorandom image. At this transition viewing angle where the content is display 500 is still marginally viewable, it may be beneficial for secondary image to be distracting or disorientating to make it difficult for an off-axis viewer to easily read the information from output surface 510.

The secondary image may be any suitable image, including a noise pattern as described above. In other embodiments, the secondary image may include bright colors, flashing graphics, or animations. The secondary image may include an optical illusion. In some cases the secondary image may appear to be a plausible workspace or desktop, which may cause the off-axis viewer to not notice that the secondary image is intended to obscure the primary image. In some cases the secondary image may be a transformation of the primary image, which could include, for example, a Fourier transformation, an inverse transformation (either in color, luminance, or both), a spatially or screen shifting transformation, a distorting transformation, or any other suitable mathematical function, formula, or algorithm. In some embodiments, the secondary image may display advertising content, either static or dynamic. The secondary image may be optimized, designed, or engineered (or the transformation or algorithm leading to the generation of the secondary image may be optimized, designed, or engineered) to balance two factors: ability to obscure the primary image off-axis and ability to be minimally obscuring to the primary image on-axis. The balance of these factors may depend on the desired application and the balance may even be varied in real time by a user or automatically adjusted based on a privacy level of content, location, ambient light, or other environmental criteria.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

The following are exemplary embodiments according to the present disclosure:

Item 1. A display device, comprising:
- a first light source and a second light source having differently oriented light distributions;
- an asymmetric turning film comprising a first major surface and a second major surface; wherein the second major surface comprises a plurality of microstructures each comprising one of a first face having a first shape and one of either a second face having a different second shape or a third face having a different third shape;
- a liquid crystal panel comprising a plurality of pixels; and
- a controller configured to independently drive the first light source, the second light source, and the liquid crystal panel;
- wherein light from the first light source is preferentially reflected by a first face but not a second face or a third face;
- wherein light from the second light source is preferentially reflected by a second face or a third face but not by a first face;
- wherein the controller is configured to rapidly switch the liquid crystal panel between a primary state and a secondary state; and
- wherein the controller is configured to also rapidly switch the driving of the first light source and the second light source such that the liquid crystal panel is in a primary state when the first light source but not the second light source is illuminated and the liquid crystal panel is in a secondary state when the second light source but not the first light source is illuminated.

Item 2. The display device of item 1, wherein the controller is configured such that the secondary state is a static state.

Item 3. The display device of item 2, wherein the static state is a noise pattern.

Item 4. The display device of item 2, wherein the static state is fully transmissive.

Item 5. The display device of item 2, wherein the static state includes an image.

Item 6. The display device of item 5, wherein the image includes a logo.

Item 7. The display device of item 5, wherein the image includes a plausible workspace.

Item 8. The display device of claim 5, wherein the image includes advertising material.

Item 9. The display device of item 1, wherein the controller is configured such that the secondary state is a dynamic state.

Item 10. The display device of item 8, wherein the dynamic state includes a transformation of the primary state.

Item 11. The display device of item 9, wherein the dynamic state includes animation.

Item 12. The display device of item 11, wherein the animation includes moving objects.

Item 13. The display device of item 11, wherein the animation includes flashing images.

Item 14. The display device of item 9, wherein the dynamic state includes advertising material.

Item 15. The display device of item 1, further comprising a lightguide configured to transport light from at least one of the first light source and the second light source.

Item 16. The display device of item 15, wherein the lightguide is wedge-shaped.

Item 17. The display device of item 15, further comprising a second lightguide configured to transport light from at least one of the first light source and the second light source.

Item 18. The display device of item 1, wherein the first major surface of the asymmetric turning film is a smooth surface.

Item 19. The display device of item 1, wherein the plurality of microstructures are linear microstructures.

Item 20. The display device of item 1, wherein the asymmetric turning film includes at least one of an antireflective coating or an antireflective structured surface.

Item 21. The display device of item 1, wherein at least one of the first face, the second face, or the third face includes a sawtooth or sinusoidal surface structure.

Item 22. The display device of item 1, wherein at least one of the first light source and the second light source comprises a plurality of LEDs.

Item 23. The display device of item 1, wherein the controller, the first light source, the second light source, and the liquid crystal panel are configured to switch from a primary state to a secondary state about every 8 ms.

What is claimed is:

1. A display device, comprising:
   a first light source and a second light source having differently oriented light distributions;
   an asymmetric turning film comprising a first major surface and a second major surface;
   wherein the second major surface comprises a plurality of microstructures each comprising a first face having a first shape and one of either a second face having a second shape, the second shape being different than the first shape, or a third face having a third shape, the third shape being different than the first shape and the second shape,
   wherein one of the plurality of microstructures includes the first face adjacent the second face and another of the plurality of microstructures includes the first face adjacent the third face;
   a liquid crystal panel comprising a plurality of pixels; and
   a controller configured to independently drive the first light source, the second light source, and the liquid crystal panel;
   wherein light from the first light source is preferentially reflected by a first face but not a second face or a third face;
   wherein light from the second light source is preferentially reflected by a second face or a third face but not by a first face;
   wherein the controller is configured to rapidly switch the liquid crystal panel between a primary state and a secondary state; and
   wherein the controller is configured to also rapidly switch the driving of the first light source and the second light source such that the liquid crystal panel is in a primary state when the first light source but not the second light source is illuminated and the liquid crystal panel is in a secondary state when the second light source but not the first light source is illuminated.

2. The display device of claim 1, wherein the controller is configured such that the secondary state is a static state.

3. The display device of claim 2, wherein the static state is a noise pattern.

4. The display device of claim 2, wherein the static state is fully transmissive.

5. The display device of claim 2, wherein the static state includes an image.

6. The display device of claim 5, wherein the image includes a plausible workspace.

7. The display device of claim 5, wherein the image includes advertising material.

8. The display device of claim 1, wherein the controller is configured such that the secondary state is a dynamic state.

9. The display device of claim 8, wherein the dynamic state includes a transformation of the primary state.

10. The display device of claim 8, wherein the dynamic state includes advertising material.

11. The display device of claim 1, further comprising a lightguide configured to transport light from at least one of the first light source and the second light source.

12. The display device of claim 1, wherein the first major surface of the asymmetric turning film is a smooth surface.

13. The display device of claim 1, wherein the plurality of microstructures are linear microstructures.

14. The display device of claim 1, wherein the asymmetric turning film includes at least one of an antireflective coating or an antireflective structured surface.

15. The display device of claim 1, wherein the controller, the first light source, the second light source, and the liquid crystal panel are configured to switch from a primary state to a secondary state about every 8 ms.

16. A display device comprising:
    a first light source and a second light source having differently oriented light distributions; and
    an asymmetric turning film comprising a first major surface and a second major surface,
    wherein the second major surface comprises a plurality of microstructures comprising:
    a first microstructure comprising a first face and a second face; and
    a second microstructure comprising a third face and a fourth face, wherein the first microstructure and the second microstructure are adjacent to each other,
    wherein the asymmetric turning film is positioned so that the first face of the first microstructure and the third face of the second microstructure preferentially reflect light from the first light source and the second face and the fourth face preferentially reflect light from the second light source; and
    wherein the first face, the second face, and the fourth face are all configured to reflect light in different directions.

17. The display device of claim 16, further comprising:
    a liquid crystal panel comprising a plurality of pixels; and
    a controller configured to independently drive the first light source, the second light source, and the liquid crystal panel;
    wherein the controller is configured to rapidly switch the liquid crystal panel between a primary state and a secondary state; and
    wherein the controller is configured to also rapidly switch the driving of the first light source and the second light source such that the liquid crystal panel is in a primary state when the first light source but not the second light source is illuminated and the liquid crystal panel is in a secondary state when the second light source but not the first light source is illuminated.

18. The display device of claim 16, wherein the display device defines a display surface, wherein light from the first light source reflected by the first face of the first microstructure and the third face of the second microstructure produce a first output distribution directed to an on-axis viewing position of the display surface.

19. The display device of claim 18, wherein first output distribution comprises a midpoint centered along an axis substantially normal to the display surface.

20. The display device of claim 18, wherein first output distribution defines a first set of characteristic viewing angles that includes a normal of the display surface.

21. The display device of claim 18, wherein light from the second light source reflected by the second face produces a second output distribution and the directed to an off-axis viewing position of the light output surface.

22. The display device of claim 18, wherein the light from the second light source reflected by the second face and the fourth face collectively produce a second output distribution directed to an off-axis viewing position of the display surface.

23. The display device of claim 22, wherein the second output distribution comprises a split distribution around a midpoint.

24. The display device of claim 22, wherein the second output distribution comprises a split distribution around the first output distribution.

25. The display device of claim 22, wherein the first output distribution defines a first set of characteristic viewing angles having a midpoint, wherein the second output distribution defines a binary second set of characteristic viewing angles different than the first set characteristic viewing angles, and wherein second set of characteristic viewing angles is split by the midpoint.

26. The display device of claim 16, wherein the plurality of microstructures comprises an alternating, random, or pseudorandom distribution of the first microstructure and the second microstructure across the second major surface.

27. The display device of claim 26, wherein the plurality of microstructures comprises the alternating distribution of the first microstructure and the second microstructure across the second major surface.

28. The display device of claim 27, wherein the plurality of microstructures increase in size across at least a portion of the alternating distribution.

29. The display device of claim 27, wherein the plurality of microstructures increase in pitch across at least a portion of the alternating distribution.

30. The display device of claim 16, wherein the second face and the fourth face are substantially non-planar.

31. The display device of claim 30, wherein the second face and the fourth face define at least one of a sawtooth, alternating parabolic, sinusoidal, or microfeatured structured surface.

32. The display device of claim 16, wherein each microstructure of the plurality of microstructures comprises at least one face that preferentially reflects light from the first light source wherein for each microstructure, light from the first light source reflected by the at least one face of each microstructure produces a first output distribution that defines a first set of characteristic viewing angles having a respective midpoint, wherein each respective midpoint is angled toward an on-axis viewing position.

33. A display device comprising:
a display surface;
a first light source and a second light source having differently oriented light distributions; and
an asymmetric turning film comprising a first major surface and a second major surface, wherein the second major surface comprises:
a plurality of microstructures each comprising a first face having a first shape and one of either a second face having a second shape, the second shape being different than the first shape, or a third face having a third shape, the third shape being different than the first shape and the second shape, wherein one of the plurality of microstructures includes the first face adjacent the second face and another of the plurality of microstructures includes the first face adjacent the third face,
wherein the first face is configured to preferentially reflect light from the first light source to an on-axis viewing position of the display surface, and
wherein at least one of the second face or the third face is configured to preferentially reflect light from the second light source to an off-axis viewing position of the display surface.

34. The display device of claim 33, wherein for each first face, light from the first light source reflected by the respective first face forms a first output distribution defining a midpoint, wherein each first face is configured so the respective midpoint is angled to the on-axis viewing position of the display surface.

35. The display device of claim 34, wherein each first face defines at least one of a sawtooth, alternating parabolic, sinusoidal, or microfeatured structured surface.

36. The display device of claim 33, wherein the plurality of microstructures comprises a plurality of the second face and a plurality of the third face.

37. The display device of claim 36, wherein light from the second light source reflected by the plurality of the second face and the plurality of the third face collectively forms a second output distribution split around the on-axis viewing position of the display surface.

38. The display device of claim 33, wherein the plurality of microstructures comprises:
a first plurality of microstructures each comprising the first face and the second face; and
a second plurality of microstructures each comprising the first face and the third face.

39. The display device of claim 38, wherein the plurality of microstructures comprises an alternating pattern of the first plurality of microstructures and the second plurality of microstructures.

40. The display device of claim 38, wherein the first plurality of microstructures increase in size across the second major surface.

41. The display device of claim 1, wherein one of the plurality of microstructures having the first face adjacent the second face is adjacent another of the plurality of microstructures having the first face adjacent the third face.

* * * * *